(12) United States Patent
Khalatian (10) Patent No.: US 9,874,990 B2
(45) Date of Patent: Jan. 23, 2018

(54) SYSTEM AND METHOD OF CONCURRENT UNOBSTRUCTED CO-BROWSING AND CHAT MESSAGING

(71) Applicant: Oracle International Corporation, Redwood Shores, CA (US)

(72) Inventor: Igor Khalatian, Morganville, NJ (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 221 days.

(21) Appl. No.: 13/762,725

(22) Filed: Feb. 8, 2013

(65) Prior Publication Data

US 2013/0212466 A1 Aug. 15, 2013

Related U.S. Application Data (60) Provisional application No. 61/597,266, filed on Feb. 10, 2012.

(51) Int. Cl.
*G06F 3/0481* (2013.01)
*G06Q 50/00* (2012.01)

(52) U.S. Cl.
CPC ........... *G06F 3/0481* (2013.01); *G06Q 50/01* (2013.01)

(58) Field of Classification Search
CPC .................................................. G06F 3/0481
See application file for complete search history.

(56) References Cited

U.S. PATENT DOCUMENTS

| 5,107,443 A | 4/1992 | Smith et al. |
| 5,515,491 A | 5/1996 | Bates et al. |
| 5,838,906 A | 11/1998 | Doyle et al. |
| 5,872,923 A | 2/1999 | Schwartz et al. |
| 5,884,014 A | 3/1999 | Huttenlocher et al. |
| 5,960,411 A | 9/1999 | Hartman et al. |

(Continued)

FOREIGN PATENT DOCUMENTS

| WO | 2007073209 | | 6/2007 |
| WO | 2008008806 | A2 | 1/2008 |
| WO | 2008008806 | A3 | 10/2008 |

OTHER PUBLICATIONS

SocialTimes, Facebook Chat Launches—Tour & First Impressions, Apr. 6, 2008, pp. 1-5.*

(Continued)

*Primary Examiner* — Scott Baderman
*Assistant Examiner* — Sookil Lee
(74) *Attorney, Agent, or Firm* — Kilpatrick Townsend & Stockton LLP (57) ABSTRACT

During a co-browsing session between a host computer and an agent computer, a co-browsing window is displayed on a display screen of the host computer. To facilitate concurrent chat messaging, a web browser running on the host computer displays a first chat window at a first area of the display screen. A second chat window is generated based on the first chat window. The first chat window is removed from display at the first area of the display screen, and the second chat window is displayed at a second area of the display screen where the second chat window obstructs less of the co-browsing window than the first chat window did before the first chat window was removed from display at the first area of the display screen.

21 Claims, 9 Drawing Sheets

(56) References Cited

U.S. PATENT DOCUMENTS

| | | | |
|---|---|---|---|
| 6,308,199 B1 | 10/2001 | Katsurabayashi | |
| 6,331,855 B1 | 12/2001 | Schauser | |
| 6,396,520 B1* | 5/2002 | Ording | 715/798 |
| 6,442,590 B1* | 8/2002 | Inala et al. | 709/204 |
| 6,460,081 B1 | 10/2002 | Doherty et al. | |
| 6,717,607 B1 | 4/2004 | Lauper et al. | |
| 6,785,708 B1* | 8/2004 | Busey et al. | 709/204 |
| 7,149,776 B1 | 12/2006 | Roy et al. | |
| 7,185,056 B2 | 2/2007 | Fujisawa et al. | |
| 7,263,526 B1* | 8/2007 | Busey et al. | |
| 7,343,567 B2* | 3/2008 | Mann et al. | 715/826 |
| 7,933,955 B2 | 4/2011 | Khalatian | |
| 8,046,259 B1* | 10/2011 | Siegel et al. | 705/14.73 |
| 8,117,560 B1 | 2/2012 | Lu et al. | |
| 8,495,660 B1* | 7/2013 | Hernacki | 719/318 |
| 8,788,949 B2* | 7/2014 | Hunt | G06Q 10/10 709/206 |
| 8,842,156 B1 | 9/2014 | Alekhin | |
| 9,313,332 B1 | 4/2016 | Kumar et al. | |
| 9,535,651 B2 | 1/2017 | Khalatian | |
| 2002/0038346 A1 | 3/2002 | Morrison et al. | |
| 2002/0101445 A1 | 8/2002 | Berque | |
| 2002/0191028 A1* | 12/2002 | Senechalle et al. | 345/800 |
| 2003/0085923 A1 | 5/2003 | Chen et al. | |
| 2003/0088623 A1* | 5/2003 | Kusuda | 709/204 |
| 2003/0093464 A1 | 5/2003 | Clough et al. | |
| 2004/0075619 A1 | 4/2004 | Hansen | |
| 2004/0078441 A1* | 4/2004 | Malik et al. | 709/206 |
| 2004/0080504 A1 | 4/2004 | Salesky et al. | |
| 2004/0210658 A1 | 10/2004 | Guillermo et al. | |
| 2004/0252185 A1 | 12/2004 | Vernon et al. | |
| 2004/0253991 A1 | 12/2004 | Azuma | |
| 2004/0268263 A1* | 12/2004 | Van Dok | G09G 5/14 715/733 |
| 2005/0129275 A1 | 6/2005 | Porter et al. | |
| 2005/0129277 A1 | 6/2005 | Porter et al. | |
| 2005/0141694 A1 | 6/2005 | Wengrovitz | |
| 2005/0223343 A1 | 10/2005 | Travis et al. | |
| 2005/0235014 A1 | 10/2005 | Schauser et al. | |
| 2005/0246634 A1 | 11/2005 | Ortwein et al. | |
| 2005/0268237 A1* | 12/2005 | Crane et al. | 715/732 |
| 2006/0031779 A1 | 2/2006 | Theurer et al. | |
| 2006/0130109 A1* | 6/2006 | Zenith | H04N 7/17318 725/110 |
| 2007/0038956 A1* | 2/2007 | Morris | 715/808 |
| 2007/0245249 A1* | 10/2007 | Weisberg | G06F 9/4443 715/758 |
| 2008/0016155 A1 | 1/2008 | Khalatian | |
| 2008/0052377 A1* | 2/2008 | Light | 709/218 |
| 2008/0167124 A1* | 7/2008 | Korchemniy | A63F 13/10 463/31 |
| 2008/0209387 A1 | 8/2008 | Biehl et al. | |
| 2008/0276183 A1 | 11/2008 | Siegristet et al. | |
| 2008/0276184 A1* | 11/2008 | Buffet | G06Q 10/10 715/752 |
| 2009/0024952 A1 | 1/2009 | Brush et al. | |
| 2009/0055500 A1* | 2/2009 | Haynes et al. | 709/207 |
| 2009/0100328 A1 | 4/2009 | Asakawa et al. | |
| 2009/0158163 A1* | 6/2009 | Stephens et al. | 715/738 |
| 2009/0164581 A1 | 6/2009 | Bove et al. | |
| 2009/0219379 A1 | 9/2009 | Rossato et al. | |
| 2009/0247136 A1 | 10/2009 | Srinivasan et al. | |
| 2009/0254840 A1* | 10/2009 | Churchill | G06F 3/0481 715/753 |
| 2009/0271713 A1 | 10/2009 | Stull et al. | |
| 2009/0327441 A1 | 12/2009 | Lee et al. | |
| 2010/0017412 A1 | 1/2010 | Horowitz et al. | |
| 2010/0036670 A1 | 2/2010 | Hill et al. | |
| 2010/0037153 A1* | 2/2010 | Rogers | 715/758 |
| 2010/0111406 A1 | 5/2010 | Hertzfeld et al. | |
| 2010/0115042 A1* | 5/2010 | Turner | 709/206 |
| 2010/0131868 A1 | 5/2010 | Chawla et al. | |
| 2010/0199187 A1 | 8/2010 | Lin et al. | |
| 2010/0257457 A1 | 10/2010 | De Goes | |
| 2010/0296646 A1 | 11/2010 | Hemm et al. | |
| 2010/0306642 A1 | 12/2010 | Lowet et al. | |
| 2011/0087984 A1* | 4/2011 | Jitkoff et al. | 715/769 |
| 2011/0154219 A1 | 6/2011 | Khalatian | |
| 2011/0173256 A1 | 7/2011 | Khalatian | |
| 2011/0276900 A1 | 11/2011 | Khan et al. | |
| 2011/0307402 A1 | 12/2011 | Krishnakumar et al. | |
| 2012/0030616 A1* | 2/2012 | Howes | G06F 3/0481 715/800 |
| 2012/0069045 A1 | 3/2012 | Hashimoto et al. | |
| 2012/0185784 A1* | 7/2012 | Katz | 715/760 |
| 2012/0189272 A1* | 7/2012 | Kunigita | H04N 21/4307 386/239 |
| 2012/0254770 A1* | 10/2012 | Ophir | 715/752 |
| 2013/0055113 A1* | 2/2013 | Chazin et al. | 715/758 |
| 2013/0080928 A1* | 3/2013 | Zhuang et al. | 715/758 |
| 2014/0119531 A1 | 5/2014 | Tuchman et al. | |
| 2014/0161241 A1 | 6/2014 | Baranovsky et al. | |
| 2014/0164934 A1 | 6/2014 | Yang | |
| 2014/0173078 A1 | 6/2014 | McCord et al. | |
| 2014/0258501 A1 | 9/2014 | D'Arcy et al. | |
| 2014/0278534 A1 | 9/2014 | Romeo | |
| 2015/0052067 A1 | 2/2015 | Thiyagarajan et al. | |
| 2015/0055772 A1 | 2/2015 | Klemm et al. | |
| 2015/0149916 A1 | 5/2015 | Mendez et al. | |
| 2015/0244814 A1 | 8/2015 | Khalatian et al. | |
| 2015/0278534 A1 | 10/2015 | Thiyagarajan et al. | |
| 2015/0310446 A1 | 10/2015 | Tuchman et al. | |
| 2015/0324772 A1 | 11/2015 | Sarris | |
| 2016/0182721 A1 | 6/2016 | Khalatian et al. | |
| 2017/0090853 A1 | 3/2017 | Khalatian et al. | |

OTHER PUBLICATIONS

Phillip Ohren, Facebook Updates Chat UI—It's Faster & More Stable, Oct. 6, 2010, pp. 1-5.*
Carl Andersen, GUI Review: Gmail® by Google®, Nov. 5, 2011 pp. 1-26.*
dictionary.com, Jul. 27, 2011, https://web.archive.org/web/20110727234611/http://dictionary.reference.com/browse/Expand, (Expand.pdf), pp. 1-2.*
Brandon De Hoyos, How to Use Facebook Chat Options, about. com, pp. 1-6, http://im.about.com/od/facebookcha1/ss/facebookchatoptions.htm, (Facebook Chat Options for Facebook Chat.pdf).*
Bold Software Partners with LiveLOOK to Enhance BoldCCM Product Suites, www.prweb.com/releases/ BoldSoftware/LiveLOOK/prweb2536784.htm, date web page visited: Nov. 17, 2009, 2 pages.
Bosco's Screen Share: Web Screen Sharing, Hutchings Software, <http://web.archive.org/web/20050305232959/www.componentx.com/ScreenShare/web.php>, Mar. 5, 2005, 7 pages.
Free Web Conferencing and Always-On Collaboration, www.vyew.com, Jul. 25. 2006, 20 pages.
Instant Screen Sharing with no download . . . , web page; showscreen.com/screen_sharing_partners, date web page visited: Jan. 3, 2010, 3 pages.
Instant Service Adds LiveLOOK's CoBrowsing Capabilities to Chat Solution, www.instantservice.com/news/20071106.html, date web page visited: Nov. 17, 2009, 2 pages.
LiveLOOK is a leading provider of real-time . . . , www.livelook.com/about_us.asp, date web page visited: Jan. 7, 2010, 2 pages.
News Release, New Jersey Economic Development Authority, Nov. 2008, 2 pages.
nGenera CIP Partners with LiveLOOK, Enhances Its Multi-Channel Solution by Boosting the Power of NGen CoBrowse, web page; www.reuters.com/article/pressRelease/idUS120651 +14-Apr-2009+BW20090414, date web page visited: Nov. 17, 2009, 3 pages.
PictureTalk FAQs, Pixion, Inc., <http://web.archive.org/web/20050305010259/www.pixion.com/supportFaq.html>, Mar. 5, 2005, 7 pages.
Press Release, LiveLOOK wins "Best Technology" at Web 2.0 Summit, Jun. 21, 2007, 1 page.

(56) References Cited

OTHER PUBLICATIONS

Screen-Sharing: One-Click Solution Lets Anyone Screen-Share Instantly From Any OS-LiveLOOK, web page: www.masternewmedia.org, date web page visited: Jan. 6, 2010, 14 pages.
TightVNC Java Viewer version 1.2.9, TightVNC project, <http://lweb.archive.org/web/20030810163821/tig htvnc.com/doc/java/READM E. txt>, Aug. 10, 2003, 8 pages.
WebsiteAiive Chooses Live look to Offer Instant Sceen Sharing, websitealive.com/articles-press/websitealive-chooses- livelook, date web page visited: Jan. 3, 2010, 2 pages.
Antoine et al., Java applet screenshot, USENET thread, <http://www.velocityreviews.com/forums/t136047-java-appletscreenshot.html, Aug. 12, 2004, 6 pages.
Siden, Signed Applet Tutorial, <http://web.archive.org/web/20060513070748/http:1/www-personal.umich. edu/ -Isiden/tutorials/signed-appletIsignedapplet.html>, Internet Archive on May 13, 2006, pp. 1-5.
Udell, Simple, single-purpose screen sharing, www.infoworld.com/prinU25674; published on InfoWorld, date web page visited: Jan. 3, 2010, 2 pages.
International Application No. PCT/US2007/073209, International Preliminary Report on Patentability dated Jan. 13, 2009, 8 pages.
International Application No. PCT/US2007/073209, International Search Report and Written Opinion dated Aug. 13, 2008, 8 pages.
U.S. Appl. No. 11/456,613, Final Office Action dated Jul. 13, 2009, 18 pages.
U.S. Appl. No. 11/456,613, Non-Final Office Action dated Aug. 8, 2008, 16 pages.
U.S. Appl. No. 11/456,613, Non-Final Office Action dated May 6, 2010, 22 pages.
U.S. Appl. No. 11/456,613, Notice of Allowance dated Jan. 12, 2011, 7 pages.
U.S. Appl. No. 12/970,501, Advisory Action dated Jul. 22, 2013, 3 pages.
U.S. Appl. No. 12/970,501, Advisory Action dated Oct. 15, 2015, 3 pages.
U.S. Appl. No. 12/970,501, Final Office Action dated May 15, 2013, 11 pages.
U.S. Appl. No. 12/970,501, Final Office Action dated Jul. 31, 2015, 12 pages.
U.S. Appl. No. 12/970,501, Non-Final Office Action dated Feb. 5, 2013, 11 pages.
U.S. Appl. No. 12/970,501, Non-Final Office Action dated Feb. 12, 2015, 12 pages.
U.S. Appl. No. 13/071,607, Non-Final Office Action dated Aug. 5, 2011, 22 pages.
U.S. Appl. No. 12/970,501, Non-Final Office Action dated Apr. 26, 2016, 14 pages.
U.S. Appl. No. 14/851,268, Non-Final Office Action dated May 9, 2016, 15 pages.
U.S. Appl. No. 12/970,501, Notice of Allowance dated Sep. 1, 2016, 7 pages.
U.S. Appl. No. 14/628,640, Non-Final Office Action dated Feb. 24, 2017, 13 pages.
U.S. Appl. No. 14/628,640, Final Office Action dated Jun. 22, 2017, 17 pages.
U.S. Appl. No. 14/851,268, Non-Final Office Action dated Jun. 20, 2017, 17 pages.
U.S. Appl. No. 14/851,268, Final Office Action dated Dec. 12, 2016, 17 pages.

* cited by examiner

SYSTEM AND METHOD OF CONCURRENT UNOBSTRUCTED CO-BROWSING AND CHAT MESSAGING

RELATED APPLICATION

This application claims the benefit of U.S. Provisional Application No. 61/597,266 filed Feb. 10, 2012, titled "System and Method of Concurrent Unobstructed Co-browsing and Chat Messaging", the entirety of which application is incorporated by reference herein.

FIELD OF THE INVENTION

The invention relates generally to screen sharing between computing systems connected to a network. More specifically, the invention relates to concurrent co-browsing and chat messaging during screen sharing.

BACKGROUND

Screen sharing between computing devices over a network has a myriad of practical applications. One practical application is collaboration between a host and a viewer. A host can give a presentation to one or more remote viewers, perform demonstrations, review documents, and share images. As an example of another practical use, screen sharing enables remote technical support. For example, by watching the keystrokes entered by a host, remote technical support staff can diagnose problems as though the present on site.

Figure 1:
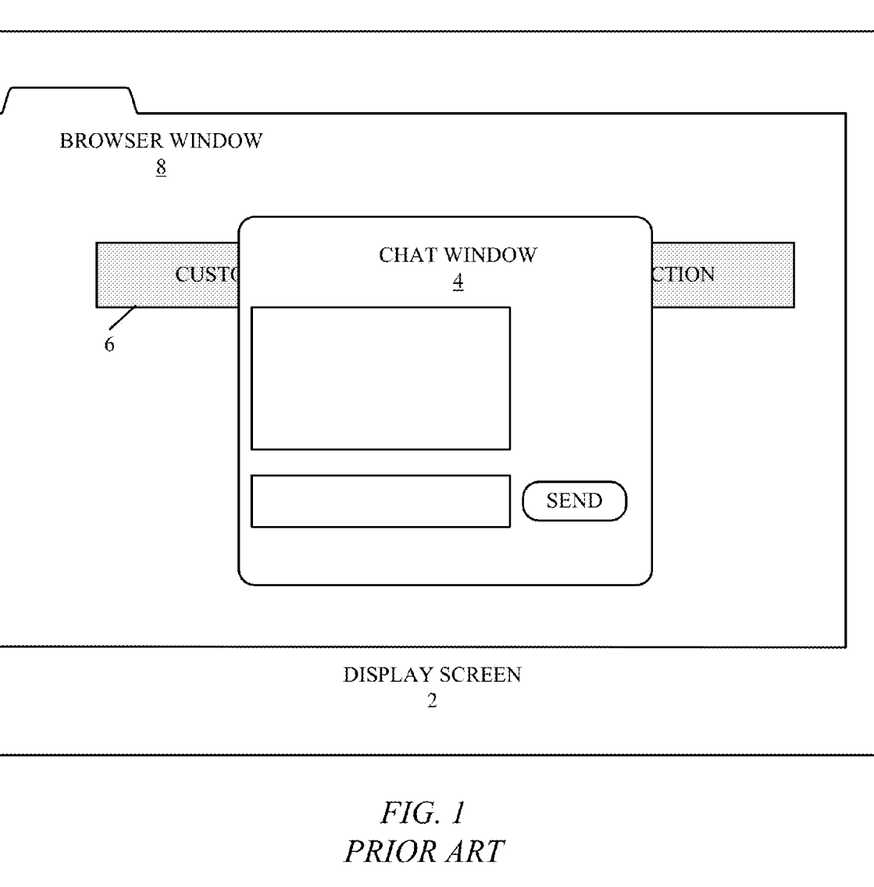
FIG. 1 is a diagram of a display screen on which appears a chat window that partially obscures a browser window.
Figure 2:
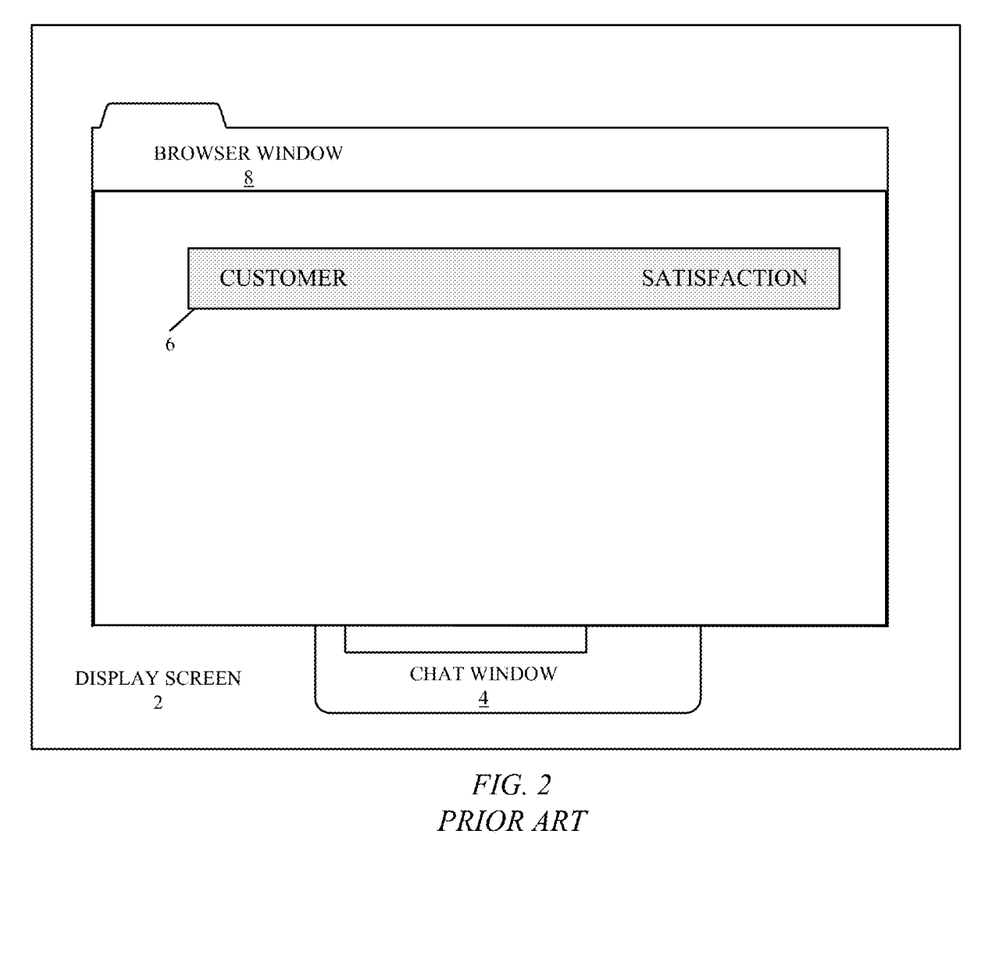
FIG. 2 is a diagram of the display screen on which appears a browser window that almost completely obscures the chat window.

During a screen-sharing session, the host typically has an open browser window prominently displayed on the display screen of the host. The viewer can also see this browser window and can follow the host as the host browses the Internet. As part of the co-browsing activity, the host and viewer can choose to engage in a chat session, for example, to ask and answer questions related to the web browsing performed by the host. Conventionally, the chat window opens in a separate browser window. However, a problem with a browser-based chat session is that the chat window typically opens on top of the web browser window, where it obscures much of the content that would be visible on the display screen. FIG. 1 illustrates this problem, wherein, on the display screen 2 of the host, a chat window 4 obscures information 6 appearing in a web browser window 8. If the parties wish to resume co-browsing, the user of the host selects the browser window 8. As illustrated in FIG. 2, resumption of co-browsing brings the browser window 8 to the forefront, where it obscures most, if not all of the chat window 4. Consequently, new chat messages presented to the chat window 4 can go unnoticed. The problem makes it difficult to chat and co-browse web pages concurrently.

SUMMARY

In one aspect, the invention relates to a method for facilitating chat messaging while co-browsing between a host computer and an agent computer, wherein a co-browsing window is displayed on a display screen of the host computer. The method comprises displaying, by a web browser running on the host computer, a first chat window at a first area of the display screen, generating a second chat window based on the first chat window, removing the first chat window from display at the first area of the display screen, and displaying the second chat window at a second area of the display screen where the second chat window obstructs less of the co-browsing window than the first chat window did before the first chat window was removed from display at the first area of the display screen.

In one aspect, the invention relates to a screen-sharing system comprising a server system conducting a screen-sharing session between a host computing system and an agent computing system over a network. The server system transmits a web page to the host computing system. The web page includes embedded computer-readable program code to be executed by the host computing system when a browser running on the host computing system displays the web page on a display screen of the host computing system. The computer-readable program code comprises computer-readable program code that, when executed by a processor, displays a first chat window at a first area of the display screen, computer-readable program code that, when executed by a processor, generates a second chat window based on the first chat window, computer-readable program code that, when executed by a processor, removes the first chat window from display at the first area of the display screen, and computer-readable program code that, when executed by a processor, displays the second chat window at a second area of the display screen where the second chat window obstructs less of the co-browsing window than the first chat window did before the first chat window was removed from display at the first area of the display screen.

DETAILED DESCRIPTION

Web-based screen-sharing systems described herein employ standard browser technology to share the screen image of a host computing system with one or more agent computing systems in near real-time. Because browser technology has become widespread, most any web-enabled computing system can participate in screen sharing. Such screen sharing through browsers is often referred to as co-browsing. As used herein, a host is a user or online visitor who is showing his or her computer screen and an agent is a user who is remotely viewing the host's computer screen. An example implementation of web-based co-browsing is described in U.S. application Ser. No. 12/970,501, filed Dec. 16, 2010, titled "Co-browsing Systems and Methods", the entirety of which application is incorporated by reference herein.

During a co-browsing session, the parties can choose to participate concurrently in browser-based instant messaging or chat messaging. The web-based screen-sharing systems described herein facilitate chat messaging while co-browsing by ensuring that the chat window obstructs little, if any, of the co-browsing window. A copy of the initial chat window automatically assumes the identity and appearance of the initial chat window. The initial chat window is removed from display, and the imposter chat window moves to an edge region of the display screen, where the parties can advantageously concurrently view the content displayed in both windows, thereby enhancing the co-browsing experience. In one embodiment, the chat window is automatically moved to a lower right corner of the display screen where it no longer obstructs or slightly overlaps the co-browsing window.

In one embodiment, the imposter chat window automatically minimizes to an icon near an edge of the display screen, expanding whenever a new message arrives to display the new message and serve as a notification, and then to collapse back to an icon after a set period. The collapsed icon can bear a message indicating the current number of unread messages.

Figure 3:
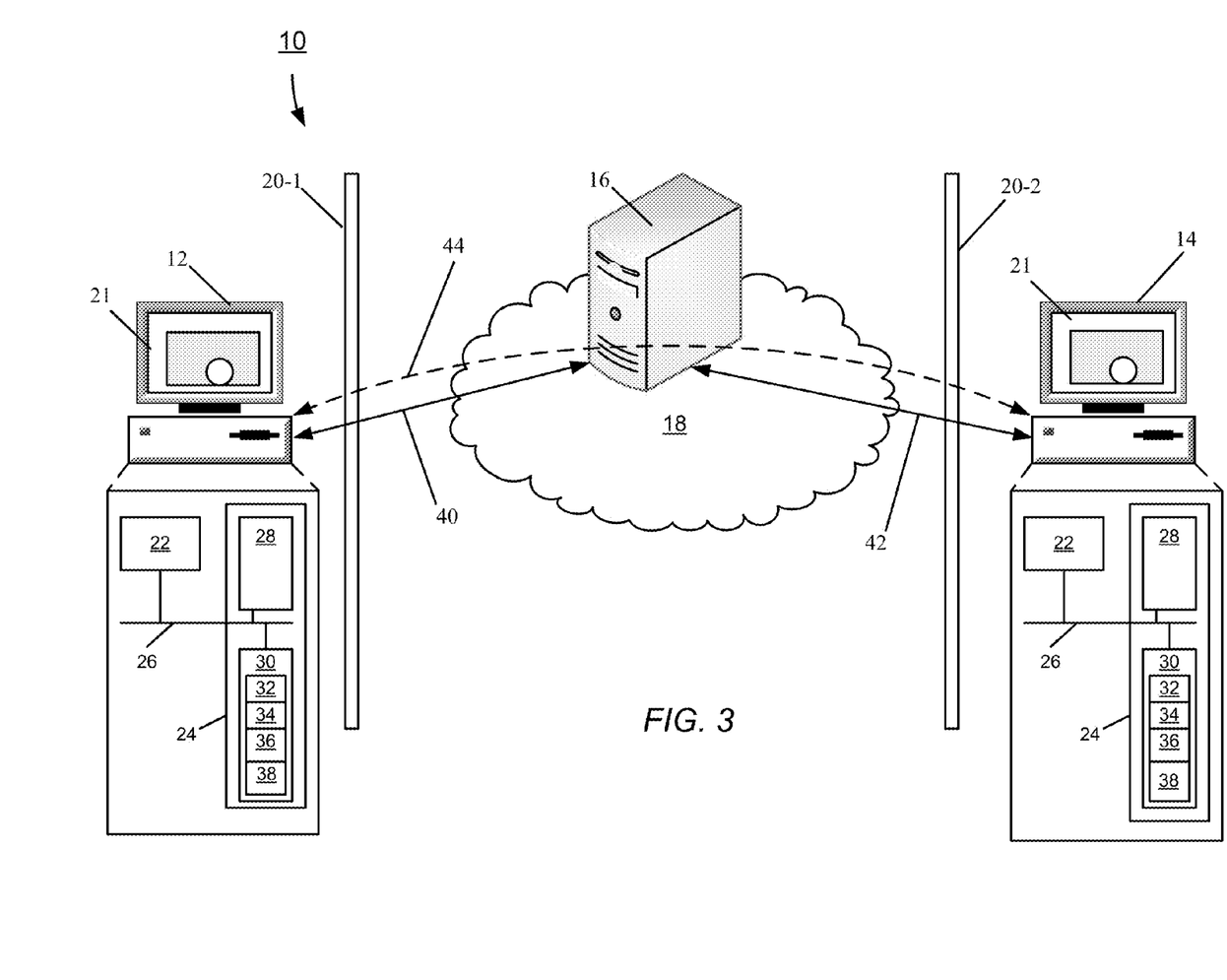
FIG. 3 is block diagram representation of an embodiment of a screen-sharing system including a server system in communication with an agent computing system and a host computing system.

FIG. 1 shows an embodiment of a screen-sharing system 10 configured for screen sharing. The screen-sharing system 10 includes a host computing system 12 and an agent computing system 14 in communication with a server system 16 over a network 18. Each of the host and agent computing systems 12, 14 may reside behind a respective firewall 20-1, 20-2, such as ZoneAlarm™, a MICROSOFT XP® built-in, or Norton Security™ firewalls, or external firewalls to isolate the computing system from the network 18. As described herein, the firewalls 20-1, 20-2 do not impede screen sharing between the host and agent computing systems 12, 14.

Each computing system 12, 14 includes a display screen 21 and a processor 22 in communication with system memory 24 over a signal bus 26. Exemplary implementations of the computing systems 12, 14 include, but are not limited to, personal computers (PC), Macintosh computers, workstations, laptop computers, kiosks, hand-held devices, such as a personal digital assistant (PDA), cellular phones, smart phones, Apple iPads™, Amazon.com KINDLEs®, navigation and global positioning systems, and network terminals.

The system memory 24 includes non-volatile computer storage media, such as read-only memory (ROM) 28, and volatile computer storage media, such as random-access memory (RAM) 30. Typically stored in the ROM 28 is a basic input/output system (BIOS), which contains program code for controlling basic operations of the computing systems 12, 14 including start-up of the computing device and initialization of hardware. Stored within the RAM 30 are program code and data. Program code includes, but is not limited to, application programs 32, program modules 34 (e.g., browser plug-ins), a native API (e.g., Windows API, MacOS API) 36, and an operating system 38 (e.g., Windows 95, Windows 98, Windows NT 4.0, Windows XP, Windows 2000, Linux, Macintosh, Windows Mobile™, Mobile Linux™, Symbian OS™, Palm OS™, Mobile OS™, and Android™).

Application programs 32 on the computing systems 12, 14 include browser software. The browser software can be any commercially available Web browser, e.g., Microsoft INTERNET EXPLORER®, Google Chrome®, Mozilla FIREFOX®, NETSCAPE®, Opera Software OPERA™ and Apple SAFARI®. Currently, most computing devices already have an installed browser when purchased from a manufacturer and deployed in the business, enterprise, or home. A web browser may use a hypertext transfer protocol (HTTP) to transfer or convey information with a web server, which can store or create resources such as hypertext markup language (HTML) files and images. When the browser of a computing system visits a Web site with an embedded applet, the computing system automatically downloads the applet from the Web server and automatically executes it. Execution of the applet may require the support of various browser plug-ins 34 (e.g., JAVA, ACTIVEX).

The browser of each computing system 12, 14 can be a JAVA-enabled browser with an interpreter, e.g., a JAVA virtual machine, for interpreting JAVA bytecode (i.e., applets, scripts) and applications. Most commercially available Web browsers have the JAVA bytecode interpreter built into the Web browser. In some operating systems, the Java Virtual Machine is installed on the computing system independently of the browser. Because they are translated into an intermediate processor-independent bytecode supported by Java Virtual Machine, JAVA applets are operating system independent. In other embodiments, the browser of the agent computing system 14, the browser of the host computing system 12, or browsers of both computing systems 12, 14 are ACTIVEX-enabled, which execute downloaded ActiveX controls. In general, the principles described herein apply to any browser capable of running applets or controls that perform screen capture.

Other application programs 32 can include, but are not limited to, an electronic mail client program, an instant messaging, and office applications, such as spreadsheet, word processor, and slide presentation software. Each application program 32 can be a proprietary or commercially available program and can run in conjunction with screen sharing.

Typically, the signal bus 26 connects the processor 22 to various other components of the computing system 12, 14 including, for example, a user-input interface, a memory interface, a peripheral interface, a video interface, a local network interface, and a wide-area network interface (not shown). The display screen 21 connects to the signal bus 26 through the video interface. Exemplary implementations of the signal bus include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus. Over a wire or wireless link, the user-input interface is in communication with one or more user-input devices, e.g., a keyboard, a mouse, trackball, touch-pad, touch-screen, microphone, joystick, by which a user can enter information and commands into the computing system 12, 14.

Embodiments of the network 18 include, but are not limited to, local-area networks (LAN), metro-area networks (MAN), and wide-area networks (WAN), such as the Internet or World Wide Web. Each computing system 12, 14 can connect to the server system 16 over the network 18 through one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g)). Broadband Internet access through, e.g., cable and DSL (Digital Subscriber Line), provide sufficient bandwidth for transporting screen-captured image data.

Figure 4:
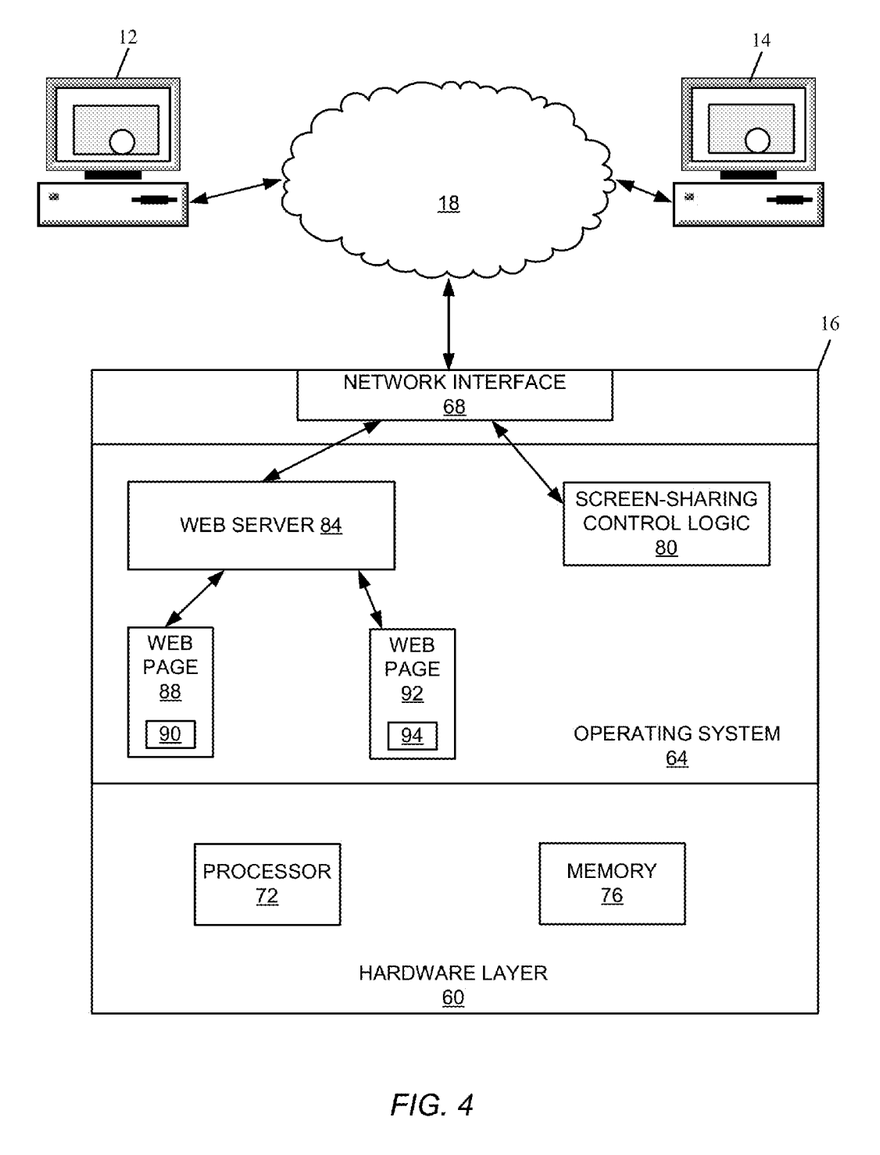
FIG. 4 is a block diagram representation of an embodiment of the host computing system.

FIG. 4 shows an embodiment of the server system 16 including a hardware layer 60 and an operating system 64. Although shown as a single machine, it is to be understood that the server system 16 can comprise multiple server computers and multiple server applications running on those server computers. A network interface 68 couples the server system 16 to the network 18. The hardware layer 60 includes a processor 72 and memory 76.

Running on the operating system 64 is screen-sharing control 80 logic and a Web server 84. In general, the screen-sharing control logic 80 orchestrates a screen-sharing session between the host computing system 12 and an agent computing system 14 as described in U.S. Pat. No. 7,933,955, issued Apr. 26, 2011, titled "One-click Universal Screen Sharing", the entirety of which patent is incorporated by reference herein. The server system 16 establishes a first HTTP connection 40 with the host computing system 12 and a second HTTP connection 42 with the agent computing system 14. By the first connection 40, the server system 16 continuously receives image (i.e., pixel) data corresponding to the screen image of the host computing system 12. Over the second connection 42, the server system 16 continuously receives requests for image data from the agent computing system 14 and responds with image data received from the host computing system 12. In effect, the server system 16 is the hub of a connection 44 (FIG. 3) established between the host computing system 12 and the agent computing system 14 for purposes of screen sharing.

The Web server 84 receives HTTP requests to access web pages identified by URLs and provides the appropriate web page to the requesting computing system 12, 14. One such web page 88 includes embedded program code 90 to be downloaded by the browser running on the host computing system in order to host a screen-sharing session and present a co-browsing window; another web page 92 includes embedded program code 94 to be downloaded by the agent computing system 14 in order to view the display screen of the host 12. In addition to producing the co-browsing window, the program code 90 includes other program code (e.g., a Java applet, or a C# click-once application, or executable) that facilitates concurrent viewing of the co-browsing window and a chat window (a browser-based chat session may already be in progress when co-browsing begins, or initiated through a co-browsing window).

Figure 5:
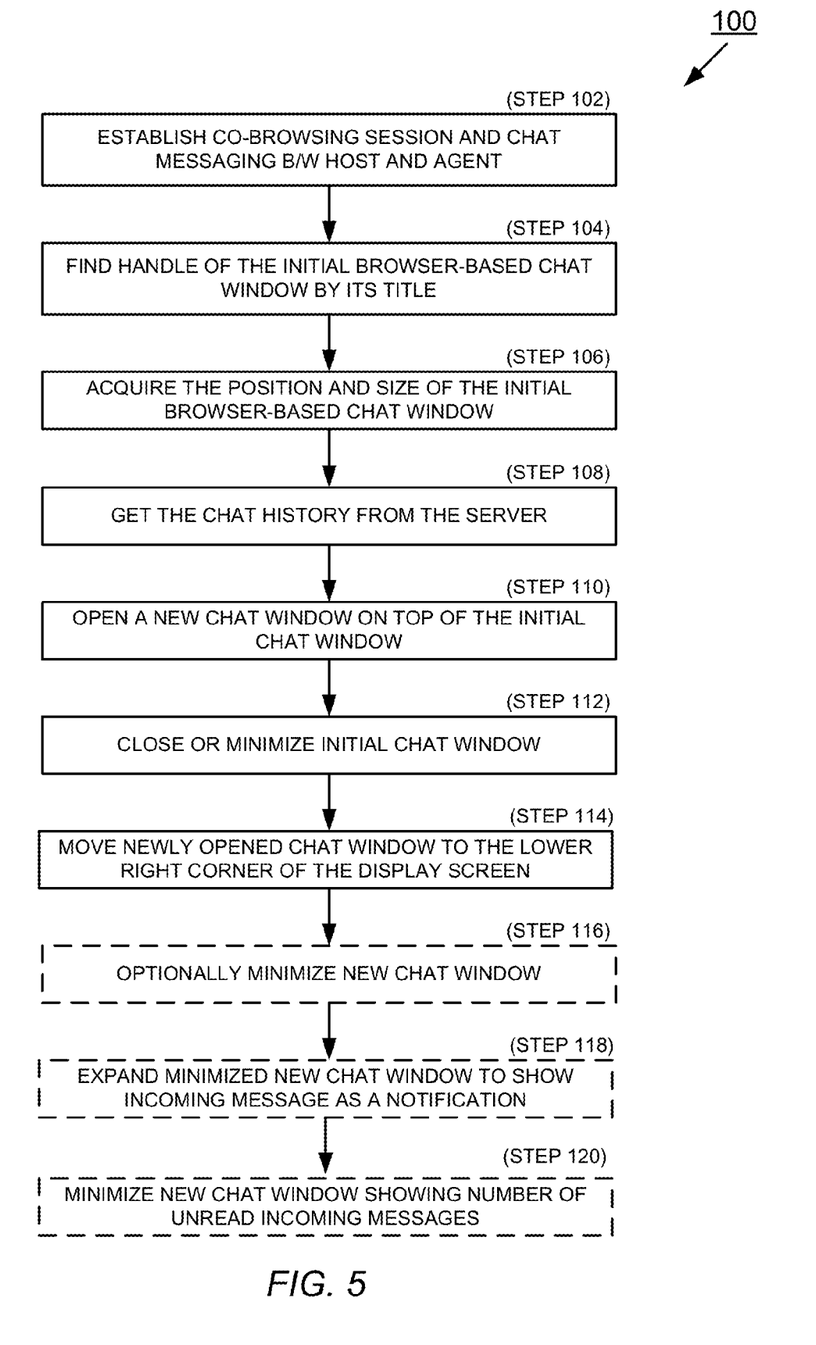
FIG. 5 is a flow diagram of an embodiment of a process for concurrent co-browsing and browser-based chat messaging with minimal obstruction to the co-browsing window by the chat window.

FIG. 5 shows an embodiment of a process 100 for concurrent execution of a co-browsing session and a chat session. At step 102, the server system 16 establishes a browser-based chat session and a co-browsing session between the host computing system 12 and agent computing system 14. (Different servers (computers and/or server applications) of the server system 16 can provide the chat services and the screen-sharing services.) A chat window 4 initially opens as a standard web browser window, for example, at or near a central location on the display screen 21 of the host computer 12. The co-browsing session produces a co-browsing window 8 that also appears on the display screen 21 of the host computer 12. If the chat window 4 opens first, the co-browsing window 8 obscures most, if not all, of the chat window 4, as illustrated in FIG. 2. If the co-browsing window 8 opens first (for example, the chat session can be initiated through the co-browsing window), the chat window 4 obscures a portion of the co-browsing window, as illustrated in FIG. 1.

The program code 90 searches for and finds (step 104) the handle of the initial browser-based chat window 4 by its title, which may be, for example, hard-coded in the program code 90 or obtained from a configuration file of the program code 90. For example, the program code 90 can use the following functions in native C/C++ or platform invocations in C# (double-slashes (//) precede comments associated with the functions):

```
//Gets top window
GetTopWindow(NULL);
//Gets window title to check against browser-based chat window title
GetWindowTextLength(hwnd);
GetWindowText(hwnd, title_buffer, title_length);
//Iterates next windows in the loop until finding window with required title
GetWindow(hwnd, GW_HWNDNEXT);
GetNextWindow(hwnd, GW_HWNDNEXT);
```

After finding the window associated with the browser-based chat window 4, the program code 90 acquires (step 106) the position and size of the browser-based chat window 4 by using, for example, the following function in native C/C++ or platform invocations in C#:

```
//Gets window position and size
GetWindowInfo(hwnd, &window);
```

The program code 90 also gets (step 108) the chat history from the server system 16 by sending an HTTPS request to the appropriate web service.

Figure 6:
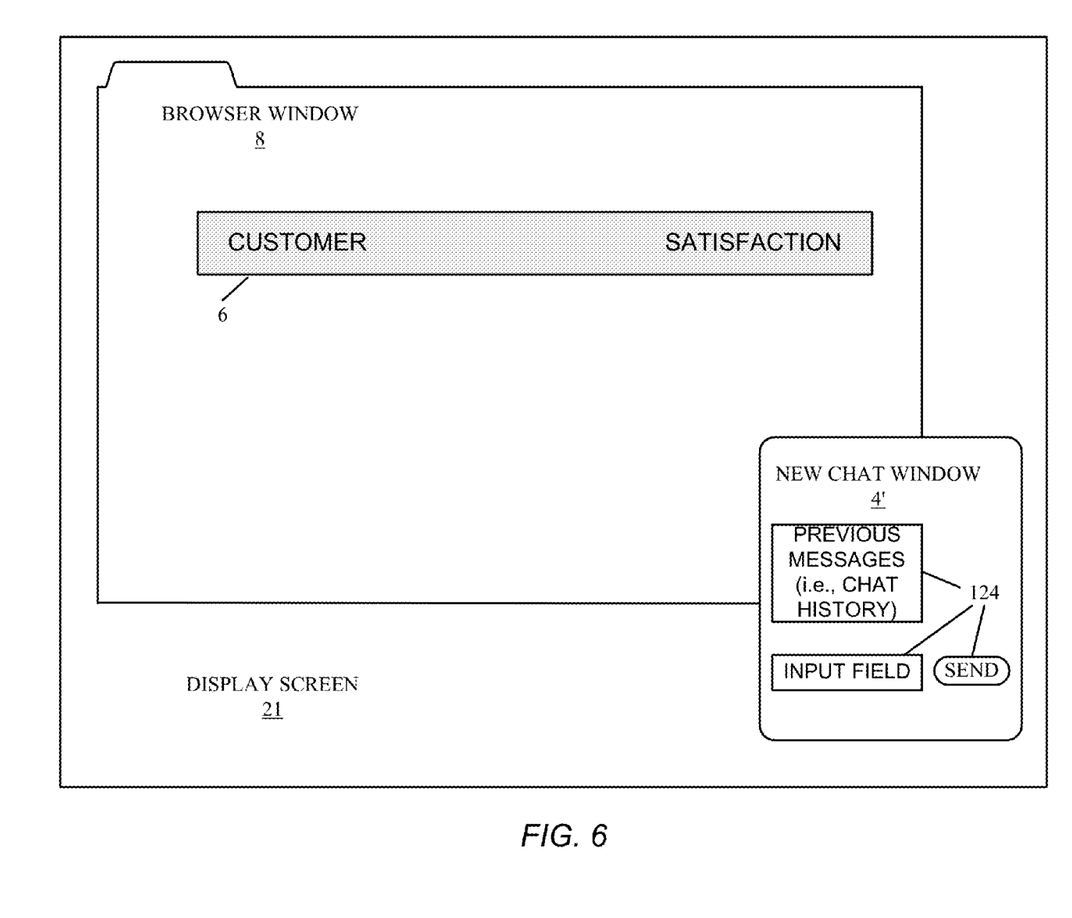
FIG. 6 is a diagram of a display screen of a host system on which appears a chat window disposed at a corner of the display screen where it causes less obstruction to the co-browsing window than centrally atop the co-browsing window.

After accumulating the information about the chat window 4, the program code 90 opens (step 110) a new chat window 4' (e.g., implemented in Java, C/C++, or C#) on top of the initial browser-based chat window 4. Preferably, the new chat window 4' opens initially at the same position of the initial chat window 4, and has the same size, user interface (e.g., ref. no 124 in FIG. 6), and content (chat history) of the browser-based chat window 4. By this initial placement, the new chat window 4' entirely obscures the initial chat window 4, and is indistinguishable from the initial chat window 4 to a user of the host computer 12; that is, the user does not discern that the program code 90 has superimposed a new chat window 4' over the initial chat window 4.

The program code 90 then closes or minimizes (step the initial browser-based chat window 4. (For instance, minimizing is performed when the program code 90 is a Java applet running in the same initial chat window 4 in order to avoid terminating the screen-sharing session). Closing or minimizing the initial chat window 4 operates to remove it from display (albeit, a display obstructed by the new chat window 4') at the initial position on the display screen. Towards this end, the program code 90 can use the following functions in native C/C++ or platform invocations in C#:

```
// Minimizes window
PostMessage(hwnd, WM_SYSCOMMAND, SC_MINIMIZE, NULL);
// Closes window
PostMessage(hwnd, WM_CLOSE, NULL, NULL);
```

After the initial chat window 4 is removed from display, the program code 90 moves (step 114) the new chat window 4' to a position on the display screen 21 where the new chat window 4' obscures less of the co-browsing window 8 than if the new chat window 4' remained at its initial position. In one embodiment, this new position is in the lower right corner of the display screen 21.

Figure 7:
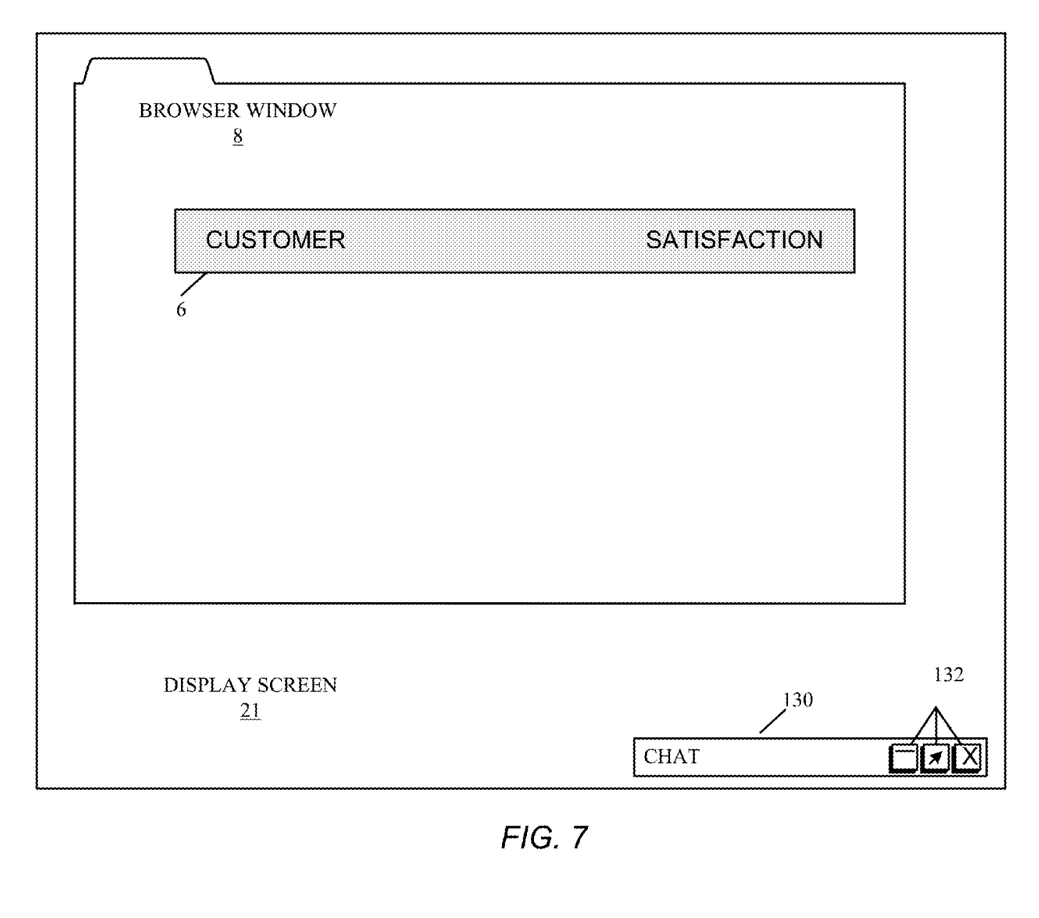
FIG. 7 is a diagram of the display screen of FIG. 6, wherein the chat window is minimized to an icon along a taskbar on the display screen.
Figure 8:
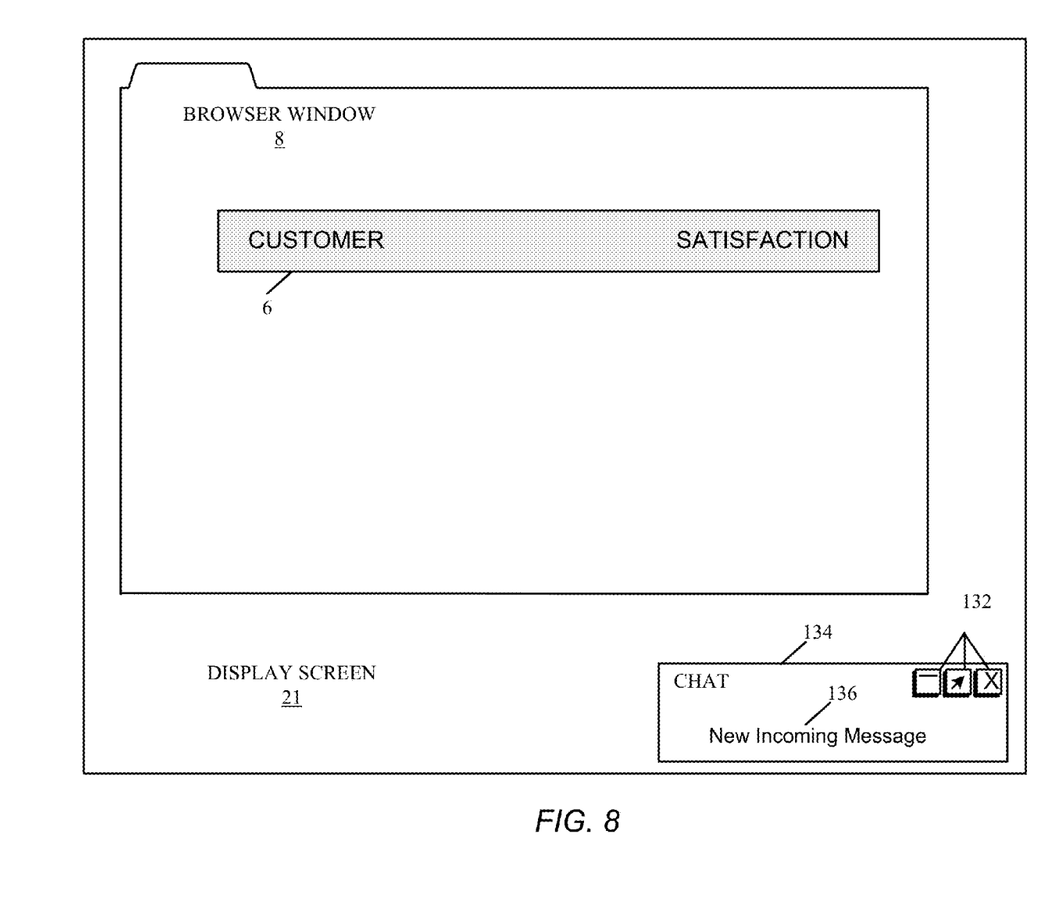
FIG. 8 is a diagram of the display screen of FIG. 6, wherein the minimized chat window expands to display an incoming message.
Figure 9:
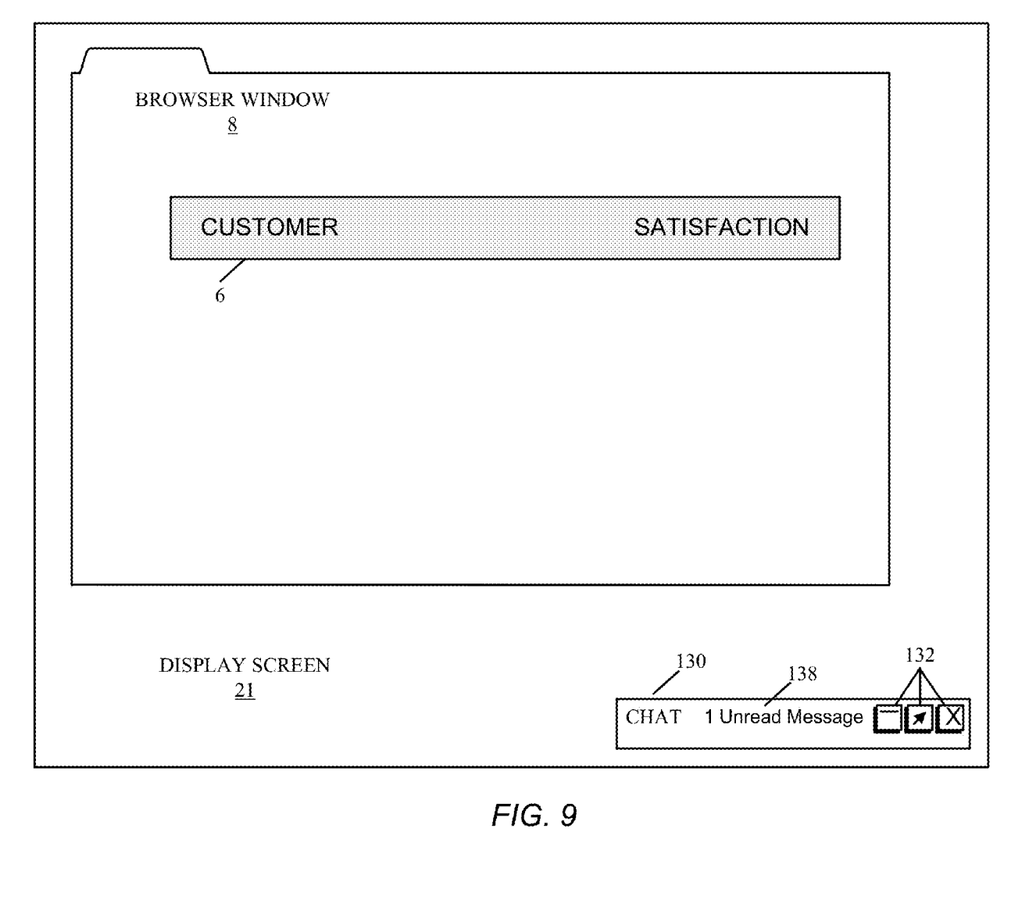
FIG. 9 is a diagram of the display screen of FIG. 6, wherein the expanded minimized chat window collapses to a minimized chat window, while displaying a number of unread messages.

In one embodiment, the program code 90 can minimize (step 116) the new chat window 4' to an icon 130, as shown in FIG. 7, which can include graphical actionable buttons 132 to close (X) (terminate) the chat session, to expand (arrow) the new chat window, and to minimize (dash) the new chat window. When a new chat message arrives, the minimized chat window (icon 130) can expand (step 118) to produce a notification 134 that displays the new message 136, as shown in FIG. 8. To receive new messages associated with a chat session, the new chat window 4' can inherit the session ID from the initial chat window 4 (presently closed or minimized). The slightly expanded notification 134 collapses back after a predetermined period (e.g., one, two, or more seconds) to the minimized chat window icon 130, wherein is displayed the current count of unread messages 138, as shown in FIG. 9.

Other embodiments of the process 100 can have one or more of the following variations. For example, the new chat window 4' can be made to obscure the initial chat window 4 completely by being larger than, rather than exactly the same size as, the initial chat window 4. Alternatively, the new chat window 4' can be smaller than the initial chat window 4. Further, the new chat window 4' can be made to have a lesser amount of or none of the chat history of the initial chat window 4. In addition, the user interface of the new chat window 4' need not be identical to that of the initial chat window 4; for example, the "SEND" button can appear in a different location or the chat history field and/or user input field can be larger or smaller than those of the initial chat window 4. Moreover, the program code 90 need not place the new chat window 4' on top of the initial chat window 4, but may initially place the new chat window 4' at its destination (e.g., as a default position) on the display screen 21 immediately after removing the initial chat window 4 from display or, depending on the timing of the start of the chat session, even before the initial chat window 4 is initially displayed. Preferably, the removal of the initial chat window 4 and replacement with the new chat window 4' occurs without any detection by the viewer of the replacement. Furthermore, the program code 90 can be configured to place the new chat window 4' at any location on the display screen 21 where the new chat window 4' does not obstruct or minimally obstructs the co-browsing window 8 (for example, the lower left corner, or upper left corner).

As will be appreciated by one skilled in the art, aspects of the present invention may be embodied as a system, method, and computer program product. Thus, aspects of the present invention may be embodied in software (including, but not limited to, firmware, program code, resident software, microcode), or in a combination of hardware and software. All such embodiments may generally be referred to herein as a module or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C#, JAVA, BASIC, Smalltalk, Pascal, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

In addition, the described methods can be implemented on an image processing device, fingerprint processing device, or the like, or on a separate programmed general purpose computer having image processing capabilities. Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the image processing system according to this invention.

Furthermore, the disclosed methods may be readily implemented in software using object or object-oriented software development environments that provide portable source code that can be used on a variety of computer or workstation platforms. Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A method for facilitating concurrent chat messaging and co-browsing between a host computer and an agent computer, the method comprising:
   displaying, by a first web browser window running on the host computer, a first chat window at a first area of a display screen;
   displaying, by an embedded program code within a second web browser window running on the host computer, a co-browsing window at a second area of the display screen, wherein the first area of the display screen overlaps the second area of the display screen;
   generating, by the embedded program code, a second chat window that is a duplicate of the first chat window, the second chat window having a same position, size, chat history, and content as the first chat window;
   displaying, by the embedded program code within a third web browser window running on the host computer, the second chat window on top of the first chat window;
   removing, by the embedded program code, the first chat window from display at the first area of the display screen; and
   moving, by the embedded program code, the second chat window to a third area of the display screen where the second chat window obstructs less of the co-browsing window than the first chat window did before the first chat window was removed from display at the first area of the display screen.

2. The method of claim 1, wherein generating the second chat window comprises:
   acquiring a handle of the first chat window;
   acquiring, in response to the acquired handle of the first chat window, position and size information associated with the first chat window; and
   acquiring a chat history associated with the first chat window.

3. The method of claim 1, further comprising:
   displaying the second chat window at the first area of the display screen on top of the first chat window before removing the first chat window from display at the first area of the display screen; and
   moving the second chat window from the first area of the display screen to the third area of the display screen after removing the first chat window from display at the first area of the display screen.

4. The method of claim 3, wherein moving the second chat window from the first area of the display screen to the third area of the display screen occurs in gradual steps to enable a viewer to follow visually the movement of the second chat window to the third area of the display screen.

5. The method of claim 1, wherein removing the first chat window from display at the first area of the display screen includes minimizing the first chat window.

6. The method of claim 1, wherein removing the first chat window from the first area of the display screen includes closing the first chat window.

7. The method of claim 1, further comprising:
   minimizing, by the embedded program code, the second chat window;
   expanding, by the embedded program code, the minimized second chat window in response to a received message to provide a notification of the message's receipt and to display the received message; and
   minimizing, by the embedded program code, the expanded second chat window after a predetermined elapsed time; and
   wherein the third area of the display screen is near a lower right corner of the display screen.

8. A system comprising:
   a processor; and
   a memory coupled with and readable by the processor and storing therein a set of instructions which, when executed by the processor, cause the processor to facilitate concurrent chat messaging and co-browsing between a host computer and an agent computer by:
   displaying, by a first web browser window running on the host computer, a first chat window at a first area of a display screen;
   displaying, by a second web browser window running on the host computer, a co-browsing window at a second area of the display screen, wherein the first area of the display screen overlaps the second area of the display screen;
   generating a second chat window that is a duplicate of the first chat window, the second chat window having a same position, size, chat history, and content as the first chat window;
   displaying, by a third web browser window running on the host computer, the second chat window on top of the first chat window;
   removing the first chat window from display at the first area of the display screen; and
   moving the second chat window to a third area of the display screen where the second chat window obstructs less of the co-browsing window than the first chat window did before the first chat window was removed from display at the first area of the display screen.

9. The system of claim 8, wherein generating the second chat window comprises:
   acquiring a handle of the first chat window;
   acquiring, in response to the acquired handle of the first chat window, position and size information associated with the first chat window; and
   acquiring a chat history associated with the first chat window.

10. The system of claim 8, further comprising:
    displaying the second chat window at the first area of the display screen on top of the first chat window before removing the first chat window from display at the first area of the display screen; and
    moving the second chat window from the first area of the display screen to the third area of the display screen after removing the first chat window from display at the first area of the display screen.

11. The system of claim 10, wherein moving the second chat window from the first area of the display screen to the third area of the display screen occurs in gradual steps to enable a viewer to follow visually the movement of the second chat window to the second area of the display screen.

12. The system of claim 8, wherein removing the first chat window from display at the first area of the display screen includes minimizing the first chat window.

13. The system of claim 8, wherein removing the first chat window from the first area of the display screen includes closing the first chat window.

14. The system of claim 8, further comprising:
  minimizing the second chat window;
  expanding the minimized second chat window in response to a received message to provide a notification of the message's receipt and to display the received message; and
  minimizing the expanded second chat window after a predetermined elapsed time; and
  wherein the second third area of the display screen is near a lower right corner of the display screen.

15. A computer-readable memory comprising a set of instructions stored therein which, when executed by a processor, cause the processor to facilitate concurrent chat messaging and co-browsing between a host computer and an agent computer by:
  displaying, by a first web browser window running on the host computer, a first chat window at a first area of a display screen;
  displaying, by a second web browser window running on the host computer, a co-browsing window at a second area of the display screen, wherein the first area of the display screen overlaps the second area of the display screen;
  generating a second chat window that is a duplicate of the first chat window, the second chat window having a same position, size, chat history, and content as the first chat window;
  displaying, by a third web browser window running on the host computer, the second chat window on top of the first chat window;
  removing the first chat window from display at the first area of the display screen; and
  moving the second chat window to a third area of the display screen where the second chat window obstructs less of the co-browsing window than the first chat window did before the first chat window was removed from display at the first area of the display screen.

16. The computer-readable memory of claim 15, wherein generating the second chat window comprises:
  acquiring a handle of the first chat window;
  acquiring, in response to the acquired handle of the first chat window, position and size information associated with the first chat window; and
  acquiring a chat history associated with the first chat window.

17. The computer-readable memory of claim 15, further comprising:
  displaying the second chat window at the first area of the display screen on top of the first chat window before removing the first chat window from display at the first area of the display screen; and
  moving the second chat window from the first area of the display screen to the third area of the display screen after removing the first chat window from display at the first area of the display screen.

18. The computer-readable memory of claim 17, wherein moving the second chat window from the first area of the display screen to the third area of the display screen occurs in gradual steps to enable a viewer to follow visually the movement of the second chat window to the third area of the display screen.

19. The computer-readable memory of claim 15, wherein removing the first chat window from display at the first area of the display screen includes minimizing the first chat window.

20. The computer-readable memory of claim 15, wherein removing the first chat window from the first area of the display screen includes closing the first chat window.

21. The computer-readable memory of claim 15, further comprising:
  minimizing the second chat window;
  expanding the minimized second chat window in response to a received message to provide a notification of the message's receipt and to display the received message; and
  minimizing the expanded second chat window after a predetermined elapsed time; and
  wherein the third area of the display screen is near a lower right corner of the display screen.

* * * * *

UNITED STATES PATENT AND TRADEMARK OFFICE
CERTIFICATE OF CORRECTION

PATENT NO. : 9,874,990 B2  
APPLICATION NO. : 13/762725  
DATED : January 23, 2018  
INVENTOR(S) : Khalatian Page 1 of 1

It is certified that error appears in the above-identified patent and that said Letters Patent is hereby corrected as shown below:

Page 3, Column 1, under Other Publications, Line 5, delete "lweb" and insert -- web --, therefor.

Page 3, Column 1, under Other Publications, Line 7, delete "WebsiteAiive" and insert -- WebsiteAlive --, therefor.

Page 3, Column 1, under Other Publications, Line 7, delete "Sceen" and insert -- Screen --, therefor.

Page 3, Column 1, under Other Publications, Line 15, delete "appletIsignedapplet.html>," and insert -- appletsignedapplet.html>, --, therefor.

In Column 4, Line 9, delete "OPERA™"" and insert -- OPERA™, --, therefor.

Signed and Sealed this  
Twenty-first Day of August, 2018

Andrei Iancu  
*Director of the United States Patent and Trademark Office*